United States Patent [19]

Hata

[11] Patent Number: 4,797,324

[45] Date of Patent: Jan. 10, 1989

[54] MAGNETIC RECORDING MEDIUM

[75] Inventor: Kotaro Hata, Ichikawa, Japan

[73] Assignee: Nippon Zeon Company, Ltd, Tokyo, Japan

[21] Appl. No.: 149,255

[22] Filed: Jan. 28, 1988

[30] Foreign Application Priority Data

Feb. 7, 1987 [JP] Japan .................................. 62-26792

[51] Int. Cl.$^4$ .............................................. G11B 5/702
[52] U.S. Cl. ............................... 428/411.1; 252/62.54; 427/128; 428/413; 428/522; 428/694; 428/900; 428/704
[58] Field of Search ...................... 428/695, 694, 425.9, 428/900, 522, 411.1, 413, 704; 427/128, 131; 252/62.54; 360/134–136

[56] References Cited

U.S. PATENT DOCUMENTS

| | | | |
|---|---|---|---|
| 4,315,057 | 2/1982 | Horigome | 428/900 |
| 4,368,237 | 1/1983 | Yamada | 422/130 |
| 4,594,174 | 6/1986 | Nakayama | 428/425.9 |
| 4,600,521 | 7/1986 | Nakamura | 428/900 |
| 4,671,998 | 6/1987 | Okita | 428/425.9 |
| 4,698,280 | 10/1987 | Mine | 428/900 |
| 4,707,411 | 11/1987 | Nakayama | 428/900 |

Primary Examiner—Ellis P. Robinson
Attorney, Agent, or Firm—Armstrong, Nikaido, Marmelstein & Kubovcik

[57] ABSTRACT

The present invention discloses a magnetic recording medium comprising a substrate and a magnetic layer formed on at least one surface of the substrate, wherein said magnetic layer is constituted of a magnetic powder and a binder which contains an epoxy-containing vinyl chloride resin and a triazinethiol compound.

16 Claims, No Drawings

MAGNETIC RECORDING MEDIUM

BACKGROUND OF THE INVENTION

The present invention relates to an improved magnetic recording medium. Particularly, it relates to a magnetic recording medium excellent in dispersibility, thermal stability and durability.

A magnetic recording medium such as magnetic tape or magnetic card is generally prepared by applying a magnetic paint comprising a magnetic powder and a binder to a substrate such as polyester film to form a magnetic layer on the substrate.

Recently, a finely divided magnetic powder having a large specific surface area has been used in the above preparation of a magnetic recording medium with the purpose of enhancing the coercivity and the maximum amount of saturation magnetization to thereby improve the signal-to-noise ratio and the magnetic recording density.

However, when a magnetic paint is prepared by using a finely divided magnetic powder and a vinyl chloride copolymer resin binder such as vinyl chloride-vinyl acetate-vinyl alcohol copolymer resin, vinyl chloride-vinyl acetate-maleic acid copolymer resin or vinyl chloride-vinyl acetate-maleic acid-vinyl alcohol copolymer resin, there occurs a problem of increase in the viscosity of the paint or lowering in the dispersibility of a finely divided magnetic powder in such a binder.

In order to improve the dispersibility of a finely divided magnetic powder, a high-shear dispersion process has been applied to the dispersion of the powder.

However, this high-shear dispersion process causes thermal decomposition of the vinyl chloride copolymer resin owing to both viscosity increase of the magnetic paint and temperature increase thereof to generate hydrogen chloride gas, which degrades the magnetic powder to lower the durability of the magnetic recording medium, thus disadvantageously damaging the reliability thereof.

Meanwhile, it has been well known that a stabilizer is added to a vinyl chloride copolymer resin to inhibit the thermal decomposition thereof.

Representative examples of such a stabilizer include low-molecular weight epoxy compounds such as epoxidized soyabean oil and n-butyl glycidyl ether and liquid organotin compounds such as dibutyltin laurate and dibutyltin maleate.

However, when a low-molecular weight epoxy compound is contained in a magnetic recording medium in a large amount, it tends to bleed from the medium to cause lowering in the durability of the medium and staining of a head. Therefore, the amount of a low-molecular weight epoxy compound to be added is restricted in itself, so that the effect thereof is also restricted.

On the other hand, when an organotin compound is added to the magnetic paint, this organotin compound acts as a catalyst for the crosslinking of an isocyanate compound, which is ordinarily added to the paint, to extremely shorten the pot life of the paint. Such a lowering in the stability of the magnetic paint brings about significant increase in the viscosity of the paint during its application to lower the dispersibility and surface smoothness of the magnetic layer.

Meanwhile, a process for crosslinking a magnetic coating film with electron beams has been proposed with the purpose of preparing a magnetic recording medium free from a problem of pot life and excellent in durability.

However, even this process using electron beams cannot give a desirable magnetic recording medium, because the binder and additives to be used in the process do not always exhibit satisfactory performances.

SUMMARY OF THE INVENTION

The present invention has been made with the purpose of overcoming the above problems of the magnetic recording medium according to the prior art.

That is, the present invention has been accomplished on the basis of a finding that the stability of a magnetic paint during its preparation is improved by using an epoxy-containing vinyl chloride resin as a binder for a magnetic powder and combining the resin with a triazinethiol compound to thereby allow the production of a high-density magnetic recording medium excellent in durability.

Thus, a first object of the present invention is to provide a magnetic recording medium excellent in dispersibility.

A second object of the present invention is to provide a magnetic recording medium excellent in thermal stability.

Further, a third object of the present invention is to provide a magnetic recording medium excellent in durability.

These objects of the present invention can be attained by a magnetic recording medium constituted of a substrate and a magnetic layer formed on at least one surface of the substrate wherein the magnetic layer comprises a magnetic powder and a binder which contains an epoxy-containing vinyl chloride resin and a triazinethiol compound.

DESCRIPTION OF THE PREFERRED EMBODIMENTS

The epoxy-containing vinyl chloride resin to be used in the present invention can be prepared by the following process (1) or (2):

(1) a process which comprises copolymerizing vinyl chloride with an epoxy-containing vinyl monomer and, if necessary, other monomer in the presence of a radical generating agent.

(2) a process which comprises subjecting a resin selected from among polyvinyl chloride, copolymers comprising vinyl chloride as a main component and chlorination products thereof to partial dehydrochlorination involving the contact with a dehydrochlorinating agent and epoxidizing the dehydrochlorinated resin with an epoxidizing agent such as percarboxylic acid.

The above processes will now be described in more detail.

PREPARATION PROCESS (1)

Examples of the epoxy-containing vinyl monomer include glycidyl ethers of unsaturated alcohols such as allyl glycidyl ether and methallyl glycidyl ether; glycidyl esters of unsaturated acids such as glycidyl acrylate, glycidyl methacrylate, glycidyl p-vinylbenzoate, methyl glycidyl itaconate, glycidyl ethyl maleate, glycidyl vinylsulfonate and glycidyl (meth)allylsulfonate and epoxidized olefins such as butadiene monoxide, vinylcyclohexene monoxide and 2-methyl-5,6-epoxyhexene.

Meanwhile, examples of the monomer to be copolymerized with an epoxy-containing monomer and vinyl chloride at need include vinyl esters of carboxylic acids such as vinyl acetate and vinyl propionate; vinyl ethers such as methyl vinyl ether, isobutyl vinyl ether and cetyl vinyl ether; vinylidene halides such as vinylidene chloride and vinylidene fluoride; esters of unsaturated carboxylic acids such as diethyl maleate, butyl benzyl maleate, di-2-hydroxyethyl maleate, dimethyl itaconate, methyl (meth)acrylate, ethyl (meth)acrylate, lauryl (meth)acrylate and 2-hydroxypropyl (meth)acrylate; olefins such as ethylene and propylene; unsaturated nitriles such as (meth)acrylonitril and aromatic vinyl compounds such as styrene, p-methylstyrene and p-methylstyrene.

The monomer to be copolymerized with an epoxy-containing monomer and vinyl chloride at need may be suitably selected from among the above monomers depending upon the object, that is, with the purpose of enhancing the compatibility of an epoxy-containing vinyl chloride resin with other resin, controlling the softening point of an epoxy-containing vinyl chloride resin to thereby enhance the solubility thereof or improving the characteristics of a coating film and the coating step.

The radical generating agent to be used in the process includes azo compounds such as azodicarbonamide; organic peroxides such as lauroyl peroxide and persulfates such as potassium, sodium or ammonium persulfates.

Although the copolymerization of the preparation process (1) may be carried out by any known process, it is preferable in terms of the solubility of the obtained copolymer to carry out it by solution or emulsion polymerization or suspension polymerization using, as a medium, a lower alcohol (such as methanol or ethanol) alone or a combination thereof with deionized water.

PREPARATION PROCESS (2)

The dehydrochlorinating agent includes basic compounds such as caustic alkalis and amines and percarboxylic acids such as peracetic acid and perbenzoic acid.

It is preferred that the weight fraction of epoxy group in the epoxy-containing vinyl chloride resin prepared by the above process (1) or (2) be 0.1 to 20% by weight. If the weight fraction is less than 0.1% by weight, the objects of the present invention will not be attained, while if it is more than 20% by weight, the amount of vinyl chloride will be too small, thus lowering the physical properties of the resin.

Meanwhile the content of vinyl chloride in the resin is generally 20% by weight or above, preferably 50 to 95% by weight. If the content is less than 20% by weight, the physical properties of the resin will be so unsatisfactory that the resin will form a coating film having too low a strength to be used as a binder.

Further, it is preferable that the resin have an average degree of polymerization of 100 to 1000. If the average degree of polymerization of the resin is less than 100, the film strength of a magnetic layer and the thermal stability thereof will be insufficient, while if it exceeds 1000, the dispersibility of a magnetic powder and the solubility of the resin will be low.

The epoxy-containing vinyl chloride resin to be used in the present invention may further contain a hydrophilic group. The use of an epoxy-containing vinyl chloride resin further containing a hydrophilic group is preferred, because such a resin enhances the dispersibility of a magnetic powder.

Examples of the hydrophilic group to be used include COOM, $SO_3M$, $SO_4M$, $PO_3M_2$ and $PO_2M_2$, wherein M is a hydrogen atom, an alkali metal or ammonium.

An epoxy-containing vinyl chloride copolymer resin further containing at least one hydrophilic group selected from the group consisting of COOM, $SO_3M$, $SO_4M$, $PO_3M_2$ and $PO_4M_2$ can be prepared by (1) a process which comprises copolymerizing vinyl chloride with a monomer having a corresponding hydrophilic group and an epoxy-containing monomer and, if necessary, other monomer, (2) a process which comprises copolymerizing vinyl chloride with an epoxy-containing monomer and, if necessary, other monomer in the presence of a radical generating agent having a corresponding hydrophilic group, or (3) a process which comprises partially reacting a copolymer comprising an epoxy-containing monomer and vinyl chloride and, if necessary, other monomer with a compound having a hydrophilic group or by a combination of these processes.

According to the present invention, an epoxy-containing vinyl chloride resin is generally used in an amount of 5 to 50 parts by weight, preferably 10 to 30 parts by weight per 100 parts by weight of a magnetic powder.

The triazinethiol to be used in the present invention is at least one compound selected from the group consisting of those represented by the general formula:

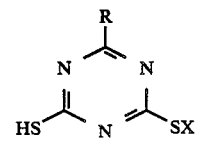

wherein X is a hydrogen atom or an alkali or alkaline earth metal and R is $OR_1$, $SR_1$ or $NR_1R_2$ (wherein $R_1$ and $R_2$ are each a hydrogen atom or a substituted or unsubstituted hydrocarbyl group having 1 to 20 carbon atoms, or alternatively, $NR_1R_2$ may be a nitrogen-containing ring formed by the connection of $R_1$ and $R_2$).

Particular examples of the hydrocarbyl group of $R_1$ or $R_2$ include alkyl groups such as methyl, ethyl, butyl, ethylhexyl and lauryl groups; cycloalkyl groups such as a cyclohexyl group; aralkyl groups such as benzyl, methylbenzyl and ethylbenzyl groups; substituted or unsubstituted aryl groups such as phenyl, naphthyl, butylphenyl and hydroxy-di-t-butylphenyl groups and alkenyl groups such as allyl and oleyl groups.

Particular examples of the nitrogen-containing ring formed by the connection of $R_1$ and $R_2$ include morpholino, piperidyl and pipecolyl groups.

Particular examples of the triazinethiol compound include trithiocyanuric acid; 2-methoxy-, 2-ethoxy-, 2-phenoxy-, 2-butylamino-, 2-anilino-, 2-naphthylamino-, 2-dimethylamino-, 2-diethylamino-, 2-dibutylamino-, 2-diphenylamino-, 2-dicyclohexylamino-, 2-morpholino- or 2-piperidyl-4,6-dithiol-s-triazine and sodium, potassium, calcium, magnesium or barium salts of these triazines.

According to the present invention, a triazinethiol compound is preferably used in an amount of 0.1 to 20 parts by weight per 100 parts by weight of a magnetic powder. If the amount of a triazine compound is less than 0.1 part by weight, it will be difficult to attain the objects of the present invention, while if it exceeds 20 parts by weight, the dispersibility of a magnetic powder will rather lower and unreacted substances will remain to lower the durability.

According to the present invention, the binder may further contain a known flexible resin such as polyurethane, polyester or acrylonitrile-butadiene copolymer resin in addition to an epoxy-containing vinyl chloride resin with the purpose of improving the adhesion or the durability. Such a flexible resin may contain an epoxy group. Alternatively, it may contain other functional group such as COOM, $SO_3M$, $SO_4M$, $PO_3M_2$ or $PO_4M_2$ (wherein M is a hydrogen atom, an alkali metal or ammonium) for the purpose of improving the dispersibility of a magnetic powder.

The magnetic powder to be used in the present invention may be any one selected from among Fe, Co, Fe alloys, Co-containing $\gamma$-$Fe_2O_3$, Co-containing $Fe_3O_4$, $\gamma$-$Fe_2O_3$, $Fe_3O_4$, barium ferrite and the like.

The magnetic paint according to the present invention may, if necessary, contain other ordinary additives such as a lubricant, dispersant, plasticizer, antistatic agent or abrasive or other ordinary resin for a magnetic paint such as phenoxy, cellulose, amino, butyral or acrylic resin, as far as the attainment of the objects of the present invention is not adversely affected. Of course, a conventional polyisocyanate compound may be added to the magnetic paint in an ordinary amount to carry out the crosslinking therewith.

Further, when a triazinethiol compound wherein R contains an unsaturated bond is used, the resulting coating film can be crosslinked or cured by the irradiation with electron beams. In such a case, an electron beam-curing resin, oligomer or monomer having at least one unsaturated bond may be used in addition to the essential components as described above.

The magnetic paint according to the present invention can be obtained as a dispersion in a desirable organic solvent by mixing an epoxy-containing vinyl chloride resin with a triazinethiol compound and a magnetic powder and, if necessary, arbitrary components as described above.

The magnetic paint thus prepared is applied to a substrate such as polyester film by ordinary means such as spray coating or roll coating and dried to form a magnetic layer on the substrate, thus giving a magnetic recording medium according to the present invention.

The magnetic recording medium according to the present invention is superior to the one according to the prior art in thermal stability, dispersibility and durability.

The enhancement in thermal stability according to the present invention is attained by a mechanism wherein the hydrogen chloride generated by the thermal decomposition of the vinyl chloride resin is captured by the epoxy group present in the molecular chain of the resin to thereby hinder the chain reaction of the decomposition. Although such an effect can be also obtained by adding an epoxy-containing compound to a binder, the present invention overcomes problems that the epoxy component bleeds to the surface of the magnetic layer to stain the head and that the stickiness of the tape increases to lower the running properties thereof, thus being significantly excellent in this regard as compared with the process of adding a conventional low-molecular weight epoxy compound such as epoxidized soyabean oil.

Further, the use of a combination of an epoxy-containing vinyl chloride resin with a triazinethiol compound according to the present invention brings about not only the enhancement in both dispersibility and thermal stability and an antistatic effect, but also other additional effects. That is, the thiol group of the triazinethiol compound is reacted with the epoxy group of the vinyl chloride resin to form a crosslink. Therefore, the obtained magnetic recording medium is also excellent in wear resistance and durability. Particularly, the crosslinking reaction of the thiol with the epoxy group proceeds in a heated atmosphere. As described above, according to the present invention, the improvement in the thermal stability of an epoxy-containing vinyl chloride resin is attained by the epoxy group contained in the resin. Further, when such a resin is used together with a triazinethiol compound in an ordinary dispersion step, the epoxy group acts as a heat stabilizer, while the thiol group acts as a dispersant. Thus, a magnetic paint excellent in thermal stability and dispersibility is obtained. Further, in the application step of the magnetic paint and in the steps subsequent to the surface molding, the reaction between both components proceeds so that they much contribute to enhancement in the wear resistance and durability.

The present invention will now be described in more detail by referring to the following examples and comparative examples, wherein all parts and percentages are by weight, unless otherwise stated.

EXAMPLE 1

Allyl glycidyl ether, vinyl chloride and 2-hydroxypropyl methacrylate were subjected to emulsion polymerization with potassium persulfate to obtain a vinyl chloride copolymer resin (A) containing 3.5% of epoxy group, 0.7% of $SO_4$ group, 0.7% of hydroxyl group and 84% of vinyl chloride.

EXAMPLE 2

Vinylcyclohexene monoxide, vinyl chloride and vinyl acetate were subjected to suspension polymerization with 2,2'-azobisisobutyronitrile to obtain a vinyl chloride resin (B) containing 3% of epoxy group, 5% of vinyl acetate and 87% of vinyl chloride.

EXAMPLE 3

Vinyl chloride, allyl glycidyl ether, sodium styrenesulfonate and vinyl acetate were subjected to emulsion polymerization with potassium persulfate to obtain a vinyl chloride resin (C) containing 1.5% of epoxy group, 1.0% of $SO_3Na$ group and 87% of vinyl chloride.

EXAMPLE 4

(Thermal stability test)

1 g of each of the vinyl chloride copolymer resins prepared in Examples 1 to 3 and 1 g of a polyurethane resin (Nippolan 2304; mfd. by Nippon Polyurethane Industry Co., Ltd.) were dissolved in tetrahydrofuran to obtain a solution. 0.8 time by equivalent as much a triazinethiol compound given in the Table, which will be described hereinbelow, as the epoxy group of the vinyl chloride copolymer resin was added to the solution, followed by the addition of 0.4 g of a polyisocyanate (Coronate L; mfd. by Nippon Polyurethane Industry Co., Ltd.). The obtained mixture was applied with a doctor blade, followed by the evaporation of the solvent. Thus, a cast film was obtained. 1 g of this cast film was put in a 15-cc test tube and the opening of the tube was stuffed with absorbent cotton nipping a congo red test paper. The resulting test tube was put in an oil bath of 150° C. to determine the time elasped until the color of the congo red test paper changes with the generated hydrochloric acid. Thus, the thermal stability of the film was evaluated.

epoxy-containing vinyl chloride resin alone, a case (Comparative Example 2) of using a conventional vinyl chloride and a triazinethiol compound and a case (Comparative Example 3) of using a conventional vinyl chloride resin alone. The results are also shown in the Table.

TABLE

| Run No. | Vinyl chloride copolymer resin | Triazinethiol compound of the general formula (1) X | —R | Thermal stability (min) | Gloss (%) | Durability |
| --- | --- | --- | --- | --- | --- | --- |
| 1 | A | H | —SH | 38 | 79 | o |
| 2 | A | H | —N(CH$_3$)$_2$ | 40 | 80 | o |
| 3 | B | H | —NHC$_6$H$_5$ | 40 | 66 | o |
| 4 | C | H | —N(C$_4$H$_9$)$_2$ | 41 | 79 | o |
| 5 | C | Na | —N(C$_4$H$_9$)$_2$ | 40 | 79 | o |
| 6 | A | H | —N(C$_8$H$_{17}$)$_2$ | 42 | 81 | o |
| 7 | B | H | —N(C$_{12}$H$_{25}$)$_2$ | 42 | 67 | o |
| 8*[1] | B | — | — | 40 | 40 | x |
| 9*[1] | VAGH*[2] | H | —N(C$_8$H$_{17}$)$_2$ | 3 | 75 | Δ |
| 10*[1] | VMCH*[3] | — | — | 1 | 70 | x |

*[1]Comparative Example
*[2]Vinyl chloride-vinyl acetate-vinyl alcohol copolymer resin; mfd. by Union Carbide Corporation
*[3]Vinyl chloride-vinyl acetate-maleic acid copolymer resin; mfd. by Union Carbide Corporation (Gloss test)

A mixture comprising 400 parts of a magnetic iron oxide powder containing cobalt adhering thereto, 70 parts of a vinyl chloride copolymer resin given in the Table, which will be described hereinbelow, 30 parts of the same polyurethane as that used in the thermal stability test, 0.8 time by equivalent as much a triazinethiol compound given in the Table as the epoxy group of the vinyl chloride copolymer resin, 300 parts of methyl ethyl ketone, 300 g of methyl isobutyl ketone and 300 parts of toluene was dispersed by high-speed shearing. 20 parts of the same polyurethane as that used in the thermal stability test was further added to the obtained dispersion, followed by mixing for 10 minutes. Thus, a magnetic paint was obtained.

This magnetic paint was applied to a polyester film so as to give a coating thickness of 5 μm, subjected to magnetic orientation and dried to form a magnetic coating film. This magnetic coating film was examined for reflectance at an angle of incidence and reflection of 60° with a gloss meter. The higher the value of the reflectance, the more excellent the dispersibility of a magnetic powder.

(Durability test)

The magnetic coating film used in the above gloss test was smoothed with a calender roll and crosslinked and cured in a thermostatic chamber of 65° C. for 40 hours. The resulting magnetic coating film was brought into contact with a rotating drum having a diameter of 40 mm, on which an abrasive paper was stuck, with a load of 100 g. The drum was rotated at 150 rpm for a specified time to enhance the degree of the stain adhering to the abrasive paper. The degree of the stain was classified into three groups, i.e., no stain "o", little stain "Δ" and significant stain "x".

The results of the above tests are shown in the Table.

It should be understood from the results shown in the Table that a magnetic recording medium excellent in thermal stability, dispersibility and durability can be obtained according to the present invention.

COMPARATIVE EXAMPLES 1 to 3

The same thermal stability, gloss and durability tests as those described in Example 4 were repeated with respect to a case (Comparative Example 1) of using an

What is claimed is:

1. A magnetic recording medium comprising a substrate and a magnetic layer formed on at least one surface of the substrate, wherein the magnetic layer is constituted of a magnetic powder and a binder which contains an epoxy-containing vinyl chloride resin and a triazinethiol compound, said triazinethiol compound being at least one compound selected from the group consisting of those represented by the general formula:

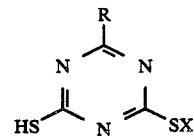

wherein X is a hydrogen atom, an alkali or alkaline earth metal and R is OR$_1$)SR$_1$ or NR$_1$R$_2$ (wherein R$_1$ and R$_2$ are each a hydrogen atom or a hydrocarbyl group having 1 to 20 carbon atoms, which may be substituted, or alternatively, R$_1$ and R$_2$ may be interconnected to form a ring), and the amount of said triazinethiol compound being 0.1 to 20 parts by weight per 100 parts by weight of the magnetic powder.

2. A magnetic recording medium as set forth in claim 1, wherein the weight fraction of epoxy group in said epoxy-containing vinyl chloride resin is 0.1 to 20% by weight.

3. A magnetic recording medium as set forth in claim 1, wherein the content of vinyl chloride in said epoxy-containing vinyl chloride resin is at least 20% by weight.

4. A magnetic recording medium as set forth in claim 1, wherein the content of vinyl chloride in said epoxy-containing vinyl chloride resin is 50 to 95% by weight.

5. A magnetic recording medium as set forth in claim 1, wherein the average degree of polymerization of said epoxy-containing vinyl chloride resin is 100 to 1000.

6. A magnetic recording medium as set forth in claim 1, wherein the amount of the epoxy-containing vinyl chloride resin used is 5 to 50 parts by weight per 100 parts by weight of the magnetic powder used.

7. A magnetic recording medium as set forth in claim 1, wherein said epoxy-containing vinyl chloride resin is a copolymer obtained by the radical copolymerization of vinyl chloride with an epoxy-containing monomer which can be copolymerized with vinyl chloride.

8. A magnetic recording medium as set forth in claim 7, wherein said epoxy-containing monomer which can be radical copolymerized with vinyl chloride is a compound selected from the group consisting of glycidyl ethers of unsaturated alcohols, glycidyl esters of unsaturated acids and epoxidized olefins.

9. A magnetic recording medium as set forth in claim 1, wherein said epoxy-containing vinyl chloride resin is a copolymer obtained by the radical copolymerization of vinyl chloride with an epoxy-containing monomer which can be radical-copolymerized with vinyl chloride, and other monomer.

10. A magnetic recording medium as set forth in claim 9, wherein said other monomer is a compound selected from the group consisting of vinyl esters of carboxylic acids, vinyl ethers, vinylidene halides, esters of unsaturated carboxylic acids, olefins, unsaturated nitriles and aromatic vinyl compounds.

11. A magnetic recording medium as set forth in claim 1, wherein said epoxy-containing vinyl chloride resin is a resin obtained by subjecting a resin selected from the group consisting of polyvinyl chloride, copolymer resins comprising vinyl chloride as a main component, chlorinated polyvinyl chloride and chlorination products of copolymer resins comprising vinyl chloride as a main component to partial dehydrochlorination and epoxidizing the partially dehydrochlorinated resin.

12. A magnetic recording medium as set forth in claim 1, wherein said epoxy-containing vinyl chloride resin further contains a hydrophilic group.

13. A magnetic recording medium as set forth in claim 12, wherein said hydrophilic group is a group selected from the group consisting of COOM, $SO_3M$, $SO_4M$, $PO_3M_2$ and $PO_4M_2$ wherein M is a hydrogen atom, an alkali metal or ammonium.

14. A magnetic recording medium as set forth in claim 1, wherein said magnetic powder is selected from the group consisting of Fe, Co, Fe alloys, Co-containing $\gamma$-$Fe_2O_3$, Co-containing $Fe_3O_4$, $\gamma$-$Fe_2O_3$, $Fe_3O_4$ and barium ferrite.

15. A magnetic recording medium as set forth in claim 1, wherein the hydrocarbyl group of $R_1$ or $R_2$ is a group selected from the group consisting of alkyl, cycloalkyl, aralkyl, substituted or unsubstituted aryl and alkenyl groups.

16. A magnetic recording medium as set forth in claim 1, wherein the ring formed by the interconnection of $R_1$ with $R_2$ is morpholino, piperidyl or pipecolyl group.

* * * * *